United States Patent
Pawlowski

(10) Patent No.: US 6,175,942 B1
(45) Date of Patent: *Jan. 16, 2001

(54) VARIABLE BIT WIDTH CACHE MEMORY ARCHITECTURE

(75) Inventor: Joseph Thomas Pawlowski, Boise, ID (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/161,899

(22) Filed: Sep. 28, 1998

Related U.S. Application Data

(63) Continuation of application No. 08/778,886, filed on Jan. 3, 1997, now Pat. No. 5,862,154.

(51) Int. Cl.[7] .......................... G11C 29/00; G06F 13/00; G06F 13/28

(52) U.S. Cl. .......................... 714/763; 711/171; 711/172

(58) Field of Search .................. 714/746, 763, 714/712, 42, 43; 711/118, 133, 144, 145, 100, 112, 113, 154, 171, 172, 117, 129; 364/243.4, 243.41, 964.2, 964.23, 964.25

(56) References Cited

U.S. PATENT DOCUMENTS

| | | | |
|---|---|---|---|
| 3,848,234 | 11/1974 | MacDonald | 340/172.5 |
| 4,084,234 | 4/1978 | Calle et al. | 364/200 |
| 4,386,402 | 5/1983 | Toy | 364/200 |
| 4,885,680 | 12/1989 | Anthony et al. | 364/200 |
| 5,015,883 | 5/1991 | Waller | 307/465 |
| 5,053,951 | 10/1991 | Nusinov et al. | 364/200 |
| 5,091,850 | 2/1992 | Culley | 395/400 |
| 5,155,824 | * 10/1992 | Edenfield et al. | 395/425 |
| 5,164,944 | 11/1992 | Benton et al. | 371/40.1 |
| 5,184,320 | 2/1993 | Dye | 365/49 |
| 5,220,215 | 6/1993 | Douglas et al. | 307/465 |
| 5,228,134 | 7/1993 | MacWilliams et al. | 395/425 |
| 5,228,135 | 7/1993 | Ikumi | 395/425 |
| 5,235,221 | 8/1993 | Douglas et al. | 307/465 |
| 5,287,017 | 2/1994 | Narasimhan et al. | 307/465 |
| 5,293,603 | 3/1994 | MacWilliams et al. | 395/425 |
| 5,298,803 | 3/1994 | Starkweather | 307/465 |
| 5,300,830 | 4/1994 | Hawes | 307/465 |
| 5,361,238 | 11/1994 | Owechko | 365/234 |
| 5,423,016 | 6/1995 | Tsuchiya et al. | 395/425 |
| 5,432,804 | 7/1995 | Diamondstein et al. | 371/43 |
| 5,553,259 | 9/1996 | Kalish et al. | 395/403 |
| 5,553,263 | 9/1996 | Kalish et al. | 395/454 |
| 5,559,986 | 9/1996 | Alpert et al. | 395/471 |
| 5,586,303 | 12/1996 | Willenz et al. | 395/497.03 |
| 5,590,352 | 12/1996 | Zuraski, Jr. et al. | 395/800 |
| 5,627,963 | 5/1997 | Gabillard et al. | 395/183.18 |
| 5,701,503 | 12/1997 | Singh et al. | 395/800 |
| 5,781,923 | 7/1998 | Hunt | 711/128 |
| 5,781,926 | 7/1998 | Gaskins et al. | 711/145 |
| 5,809,514 | 9/1998 | Nasserbakht et al. | 711/3 |
| 5,809,530 | 9/1998 | Samra et al. | 711/140 |
| 5,825,788 | * 10/1998 | Pawlowski | 714/763 |
| 5,862,154 | * 1/1999 | Pawlowski | 714/763 |

* cited by examiner

Primary Examiner—Christine T. Tu
(74) Attorney, Agent, or Firm—Schwegman, Lundberg, Woessner & Kluth, P.A.

(57) ABSTRACT

A system and method of efficiently transferring a cache line of data between a cache memory to a processor. A first group of M words is transferred between the cache memory and the processor in a first cache transfer cycle, where the first group of M words includes a tag word and M-1 words from the plurality of data words in the cache line. A second group of M words is transferred between the cache memory and the processor in a second cache transfer cycle, where the second group of M words includes M additional words from the plurality of data words. The process continues until the entire cache line has been transferred between the cache memory and the processor.

35 Claims, 6 Drawing Sheets

| TAG/ECC | TAG/ECC | WORD A.1 | WORD A.2 | WORD A.3 | WORD A.4 | ~40.1 |
| WORD D.1 | WORD D.2 | WORD B.1 | WORD B.2 | WORD B.3 | WORD B.4 | ~40.2 |
| WORD D.3 | WORD D.4 | WORD C.1 | WORD C.2 | WORD C.3 | WORD C.4 | ~40.3 |

FIG. 4A

| TAG | WORD A.1 | WORD A.2 | WORD A.3 | WORD A.4 | ~50.1 |
| TAG/ECC | WORD B.1 | WORD B.2 | WORD B.3 | WORD B.4 | ~50.2 |
| TAG/ECC | WORD C.1 | WORD C.2 | WORD C.3 | WORD C.4 | ~50.3 |
| TAG/ECC | WORD D.1 | WORD D.2 | WORD D.3 | WORD D.4 | ~50.4 |

FIG. 4B

VARIABLE BIT WIDTH CACHE MEMORY ARCHITECTURE

This application is a continuation of U.S. Ser. No. 08/778,886 filed Jan. 3, 1997 now U.S. Pat. No. 5,862,154.

BACKGROUND OF THE INVENTION

1. Field of the Invention

The present invention relates to memory architectures and in particular to a cache memory architecture.

2. Background Information

The speed with which a processor can access data is critical to its performance. At the same time, providing uniformly fast memory access can be cost prohibitive. To get around this problem, computer architectures have relied on a mix of fast, less dense, memory and slower bulk memory. In fact, many computer architectures have a multilevel memory architecture in which an attempt is made to find information in the fastest memory. If the information is not in that memory, a check is made at the next fastest memory. This process continues down through the memory hierarchy until the information sought is found. One critical component in such a memory hierarchy is a cache memory.

Cache memories rely on the principle of locality to attempt to increase the likelihood that a processor will find the information it is looking for in the cache memory. To do this, cache memories typically store contiguous blocks of data. In addition, the cache memory stores a tag which is compared to an address to determine whether the information the processor is seeking is present in the cache memory. Finally, the cache memory may contain status or error correcting codes (ECC). Cache memories are usually constructed from higher speed memory devices such as static random access memory (SRAM).

In the case where the processor operates on longwords (i.e. four 16-bit words), processor-cache interfaces described to date use a 64-bit bus for data and an additional bus for tag. The tag bus width varies, but has nominally been 16-bit for a total of 80 bits. The problem with such an approach is that if the cache block (also called line) size is four times the data bus width, then no useful information appears on the tag bus for three out of every four bus cycles. This is a waste of bus bandwidth which can adversely affect processor performance.

In addition, the typical cache memory transfers a cache line as a contiguous block of data, starting at the first word in the cache line and proceeding through to the last. This method of transferring cache lines does not take into account the fact that the processor may have no need for the first word in the cache line and that, therefore, it must wait a number of cycles until the word it is looking for is transferred.

What is needed is a system and method for storing and retrieving cache data which increases utilization of the bandwidth available at the processor-cache interface. In addition, what is needed is a new SRAM architecture which not only increases processor-cache interface bandwidth utilization but which also can be used for a number of different data bus widths. In addition, what is needed is a method of ordering the data transferred from cache memory to the processor which increases the likelihood that useful data is transferred in the first transfer cycle.

SUMMARY OF THE INVENTION

The present invention is a system and method of efficiently transferring a cache line of data between a cache memory to a processor. A first group of M words is transferred between the cache memory and the processor in a first cache transfer cycle, where the first group of M words includes a tag word and M-1 words from the plurality of data words in the cache line. A second group of M words is transferred between the cache memory and the processor in a second cache transfer cycle, where the second group of M words includes M additional words from the plurality of data words. The process continues until the entire cache line has been transferred between the cache memory and the processor.

According to another aspect of the present invention, selection control logic can be used to select an optimal set of data words to be transferred during the first, and subsequent, cache transfer cycles.

BRIEF DESCRIPTION OF THE DRAWINGS

FIGS. 4a and 4b are illustrations of data, tag and ECC transfers according to the present invention;

DETAILED DESCRIPTION OF THE PREFERRED EMBODIMENTS

In the following Detailed Description of the Preferred Embodiments, reference is made to the accompanying Drawings which form a part hereof, and in which are shown by way of illustration specific embodiments in which the invention may be practiced. It is to be understood that other embodiments may be utilized and structural changes may be made without departing from the scope of the present invention.

Figure 1:
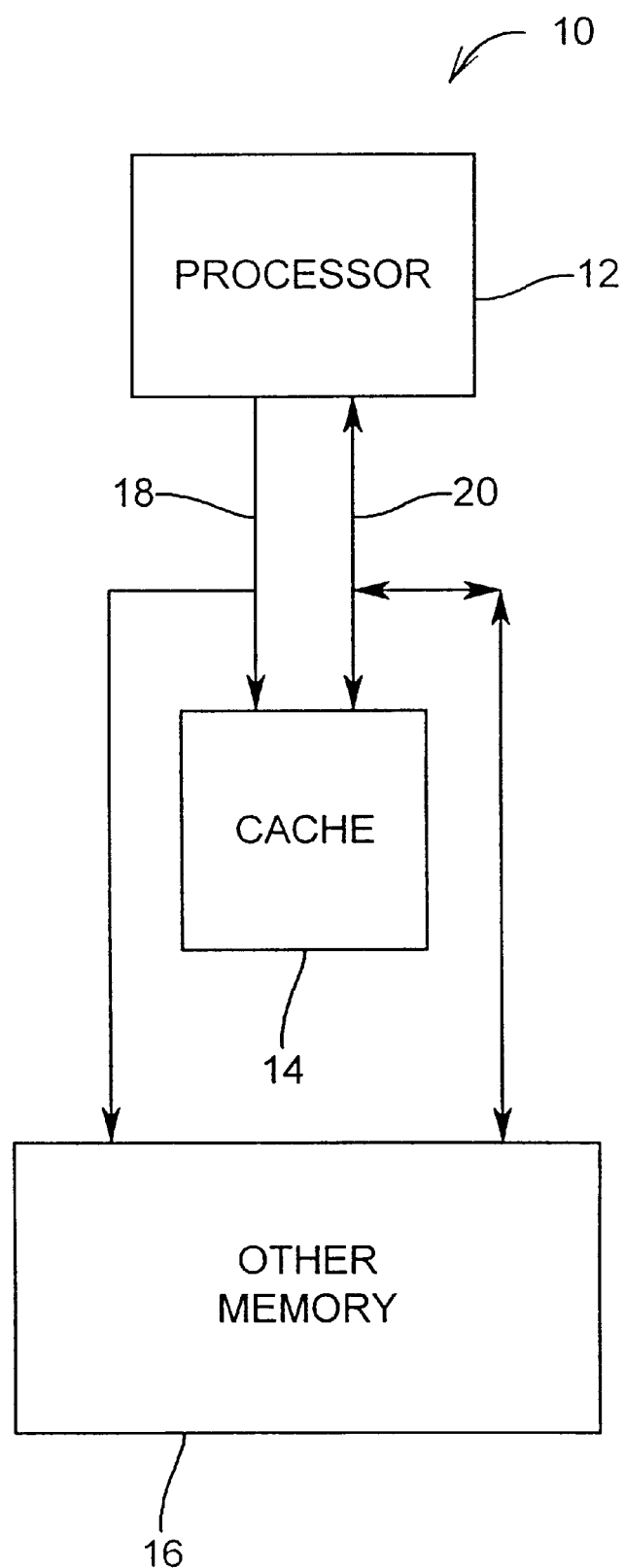
FIG. 1 illustrates a multiple memory level computer system in which a processor communicates with a cache memory and other memory over an address bus and a data bus.

FIG. 1 illustrates a multiple memory level computer system 10 in which a processor 12 communicates with a cache memory 14 and a memory 16 over an address bus 18 and a data bus 20. In one embodiment, processor 12 is a 64-bit microprocessor which transfers data as longwords (i.e. four 16-bit words). In such an embodiment, cache memory 14 uses a data transfer methodology which provides higher useful data throughput on data bus 20 than what has been previously achieved with an equivalent width data bus. This is accomplished by merging tag, ECC and data into an ordered block of information to maximize bus utilization.

Figure 2:
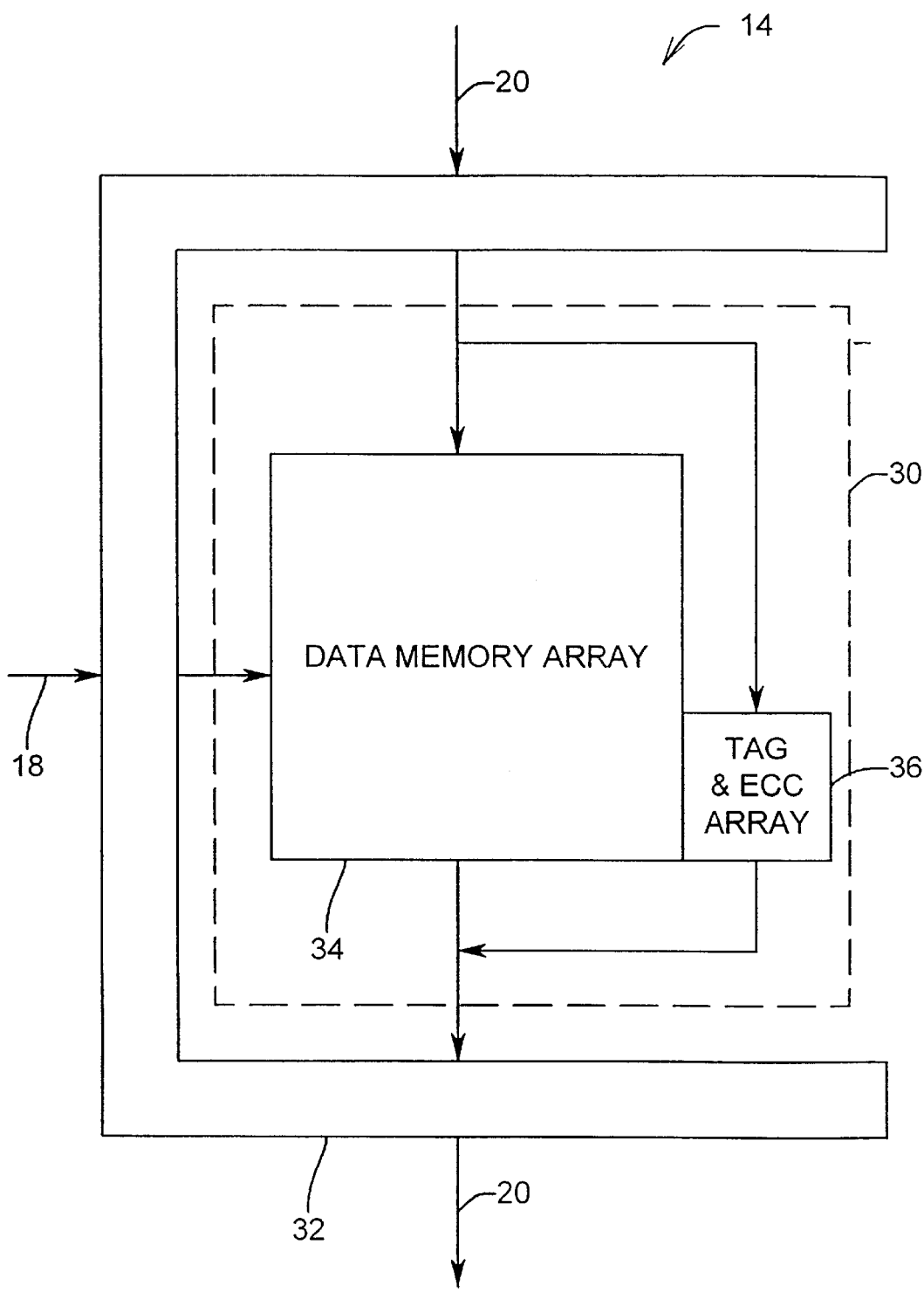
FIG. 2 illustrates a logical representation of a cache memory according to the present invention.

Cache memory 14 includes a memory array 30 and a processor-cache interface 32. A logical representation of cache memory 14 is shown in FIG. 2. In the system of FIG. 2, processor cache interface 32 is connected to processor 20 over an M-word wide bus. Cache memory 14 is configured as an N line cache, where each cache line includes a tag word and P words of data. In one embodiment, as is shown in FIG. 2, the P words of data also include one or more error correction code (ECC) words. In the system shown in FIG. 2, memory array 30 can be logically partitioned into a data memory array 34 and a tag & ECC array 36. One such logical partitioning is shown in FIG. 3 for a cache line made up of a tag word, an ECC word and four longwords (each longword is made up of four words).

Figure 3:
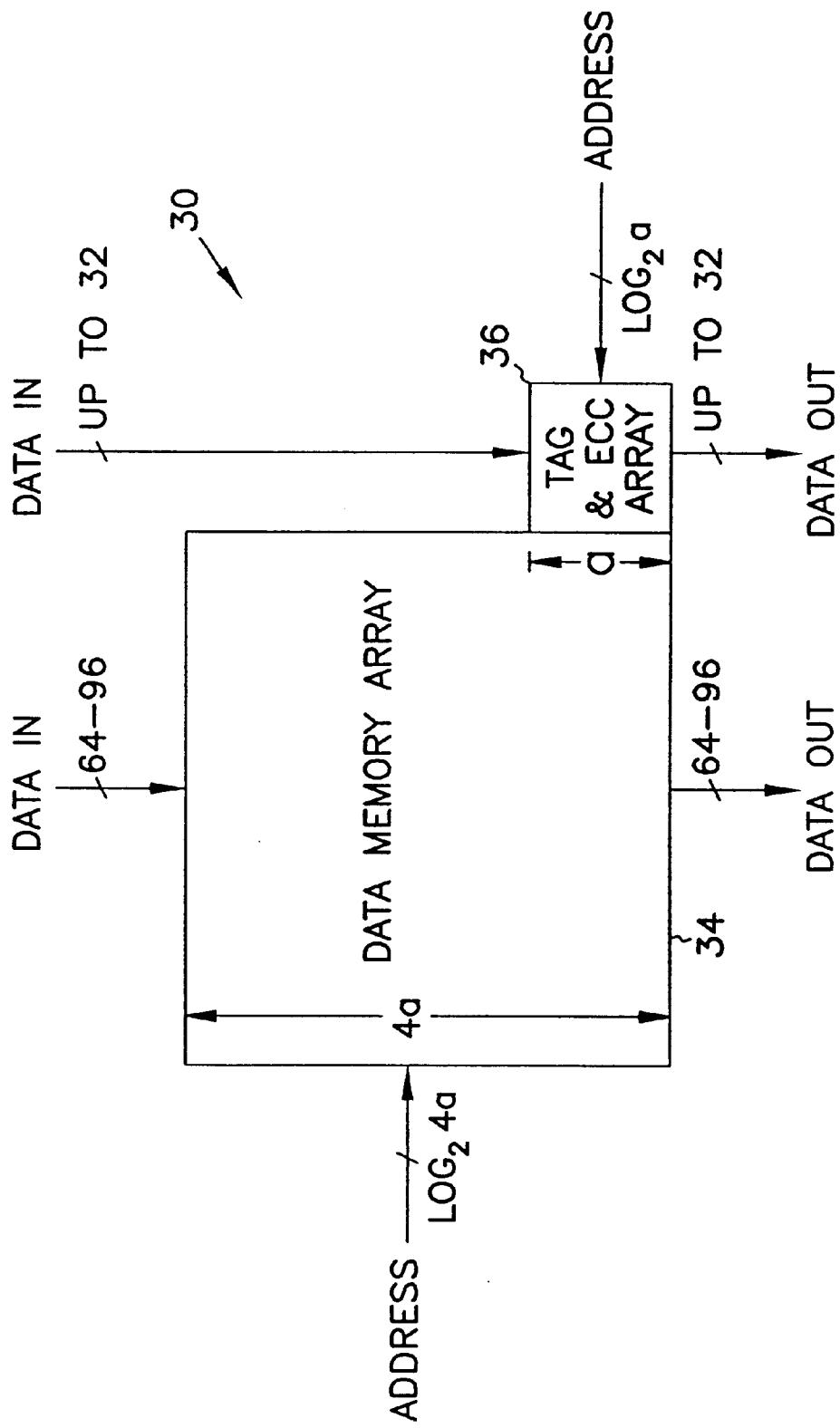
FIG. 3 is a logical representation of one embodiment of a cache memory according to FIG. 2.

In the system shown in FIG. 3, data in memory array 34 is addressed as a 4ax64 bit array while data in tag & ECC array 36 is logically addressed as an a x y array (where y is the width of the combined tag and ECC words). In such an embodiment, tag & ECC array 36 ignores the two least significant bits of address bus 18.

As can be seen in FIG. 2, processor-cache interface 32 transfers cache lines from memory array 30 to processor 12 over M-word wide data bus 20. For each cache line to be transferred, interface 32 transfers a first group of M words in a first cache transfer cycle. The first group of M words includes a tag word and M-1 of the P data words from the cache line. In the second cache transfer cycle, interface 32 transfers a second group of M words. The second group of M words includes M additional words from the P data words. This process continues until all P data words have been transferred to data bus 20. In one embodiment, where the P data words includes an error correcting code word, interface 32 transfers the error correcting code word as one of the M-1 words transferred in the first cache transfer cycle.

The methodology described above can be understood by looking at examples. For instance, in the embodiment shown in FIG. 3, if M equals six a cache line is transferred in three cache transfer cycles 40.1–3. In one such embodiment, such as is shown in FIG. 4a, the first M-word transfer includes the tag word, the ECC word and one of the four longwords. The second M-word transfer includes a second longword and one half of a third longword while the third M-word transfer includes the remainder of the third longword and the entirety of the last longword. The result is that, for a system based on 16-bit words, a cache line that would typically be transferred in four cycles on an 80-bit data bus 20 can be transferred in three cycles on a 96-bit data bus 20.

(It should be noted that it is critical to transfer the word addressed and the cache line tag word as early in the process as possible, preferably within the first transfer cycle. Conversely, ECC cannot be used until you have received the entire cache line; therefore it is among the least critical of the data to be transferred. In the embodiment shown in FIG. 4a, ECC is transferred in the first transfer cycle. This ordering simplifies the logic needed to transfer the cache line data words and reduces the number of writing paths that must be available. In addition, it should be noted that ECC is not a necessary component but it may be useful to allow space for this to be implemented. If ECC is not desired, the slot could be used for control functions such as cache snooping.)

On the other hand, if in a system based on FIG. 3, M is chosen to equal five, a cache line transfer will require four cache transfer cycles 50.1–4. In one such embodiment, such as is shown in FIG. 4b, the first M-word transfer includes the tag word and one of the four longwords. The second M-word transfer includes the ECC word and a second longword. The third M-word transfers includes a third longword and any additional ECC words (if needed) while the fourth M-word transfer includes the last longword.

Figure 5:
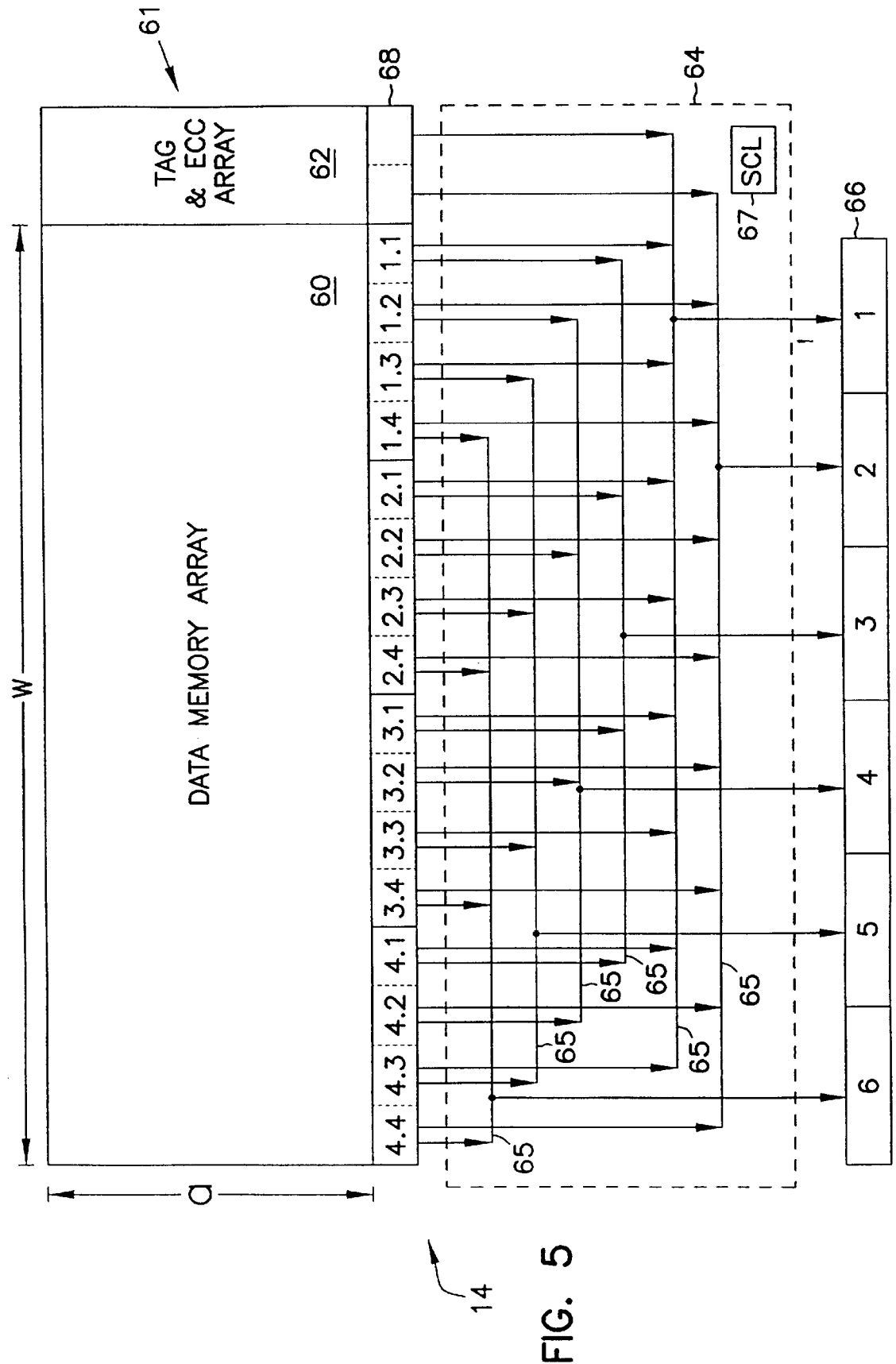
FIG. 5 is a block diagram representative of one embodiment of a cache memory.

In one embodiment, cache memory 14 is implemented using a memory array which can support an architecture based on both M equals five and M equals six. One such cache memory 14 is shown in FIG. 5. Cache memory 14 includes a cache memory array 61, a routing circuit 64 and a processor-cache interface 66. Cache memory array 61 includes a data memory array 60, a tag & ECC memory array 62 and a sense circuit 68. Data memory array 60 and a tag & ECC memory array 62 are connected through sense circuits 68 and routing circuit 64 to processor-cache interface 66. Routing circuit 64 includes selector circuits 65 and selection control logic 67. Selection control logic 67 controls the transfer of words from arrays 60 and 62 through selector circuits 65 to specific words within processor-client interface 66. In the embodiment shown, each line of the combined data memory array 60 and tag & ECC memory array 62 is a cache line in cache memory 14.

For 16-bit words, the architecture shown in FIG. 5 employs a data ordering scheme to permit higher useful data throughput on a 96-bit bus than what has been previously achieved with an 80-bit bus. To accomplish this, the architecture integrates data, tag, status and ECC. In the example shown an entire block (which in this example is made up of a group of four longword data operands (longwords 1–4), tag, optionally status and/or ECC) is manipulated at one time with external routing at the appropriate width (via routing circuit 64).

The advantage of the architecture used for data memory 60, tag & ECC array 62 and sense circuit 68 in FIG. 5 is the provision to route memory array contents to/from processor-cache interface according to either an 80(+) or 96-bit data ordering concept. In FIG. 5, the pathways which must be available in routing circuit 64 in order to implement the six word wide operation are shown as arrows. At each cache memory transfer cycle, selection control logic 67 enables six of the 34 available pathways in order to provide the composite six word wide bus transaction. In one group of embodiments, where a 16-bit word is used, data memory array 60 is 256-bits wide and tag+ECC+status array 62 is 16 to 32-bits wide. If the tag+ECC+status array is 16-bits wide or less, then one less pathway is required (i.e. eliminates the pathway from the tag/ECC array to output word number 2 in the diagram). Using this architecture, sufficient bandwidth is present in the three 96-bit cycles to deliver as much data and tag information as is present in four cycles at 80-bits due to the compactness of data transactions.

Figure 6:
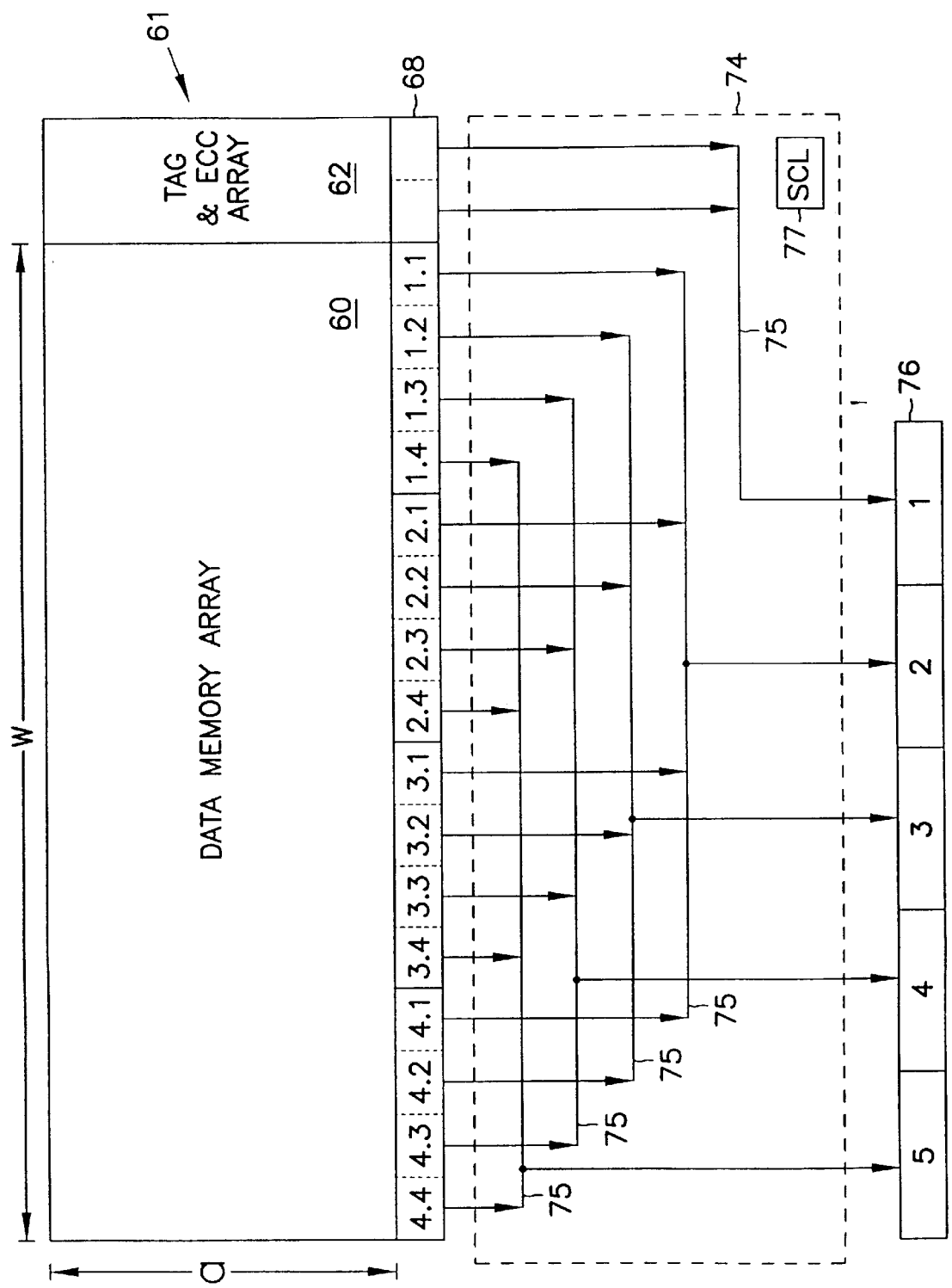
FIG. 6 is a block diagram representative of another embodiment of a cache memory.

FIG. 6 illustrates the physical organization of a cache memory 14 with data routing implementing an 80(+) -bit device. As in FIG. 5 above, cache memory 14 includes a cache memory array 61. Cache memory array 61 includes a data memory array 60, a tag & ECC memory array 62 and a sense circuit 68. In addition, cache memory 14 of FIG. 6 includes a routing circuit 74 and a processor-cache interface 76. Data memory array 60 and a tag & ECC memory array 62 are connected through sense circuit 68 and routing circuit 74 to processor-cache interface 76. Routing circuit 74 includes selector circuits 75 and selection control logic 77. Selection control logic 77 controls the transfer of words from arrays 60 and 62 through selector circuits 65 to specific words within processor-client interface 76. As in the embodiment shown in FIG. 5, the architecture shown in FIG. 6 integrates data, tag, status and ECC. In the example shown an entire block (which in this example is made up of a group of four longword data operands (longwords 1–4), tag, optionally status and/or ECC) is manipulated at one time with external routing at the appropriate width (via routing circuit 74).

In the embodiment shown in FIG. 6, the pathways which must be available in routing circuit 74 in order to implement the five word wide operation are shown as arrows. At each cache memory transfer cycle, selection control logic 77 enables five of the 17–20 available pathways in order to provide the composite five word wide bus transaction. As in FIG. 5, in one group of embodiments, where a 16-bit word is used, data memory array 60 is 256-bits wide and tag+ECC+status array 62 is 16 to 32-bits wide. If tag+ECC+ status array 62 is 16-bits wide or less, then one less pathway is required (i.e. only 17 pathways are needed). On the other hand, tag+ECC+status array 62 can be up to four words wide and all necessary transfers can still be accomplished in only four transfer cycles. (In one such embodiment, tag+ECC+ status array 62 could be 64-bits wide maximum with an 80-bit bus resulting in the 20 necessary pathways, all feeding into output block number 1.) Since ECC and status information may transact on bits once restricted to tag use only, this architecture is superior to previous implementations in its ability to make more use of the bits normally defined as tag only.

It can be readily seen from examining FIGS. 5 and 6 that routing circuit 74 and processor-cache interface 76 of FIG. 6 are basically a subset of routing circuit 64 and processor-cache interface 66, respectively, of FIG. 5 (blocks one and two of FIG. 5 are merged into block one of FIG. 6). Therefore, the same cache memory 14 architecture can function as either a six word wide (e.g. 96-bit) or five word wide (e.g. 80(+) -bit) device with the necessary selection logic modifications.

In one group of embodiments, selection control logic 67 and selection control logic 77 transfer data words from array 60 in the order in which they are stored in data memory array 60 (e.g., longword 1 is transferred first, followed by longwords 2–4). Such an approach does not take into account whether the first word or the last word transferred is the one sought by processor 12. This results in a less efficient transfer of data between cache memory 14 and processor 12. The reason for this is that, in the course of operating on a whole block of data, the highest probability of utilizing data in the block is 100% for the initial address, and less for each subsequent address. The probability is much lower for the previous address. Therefore, in a system designed to optimize data transfer, if, e.g., the initial address is 01, the address before it, namely 00, is the least necessary to have and should therefore have less priority.

With this in mind selection control logic 67 and 77 can be designed to more efficiently transfer the contents of a cache line to processor 12. In one embodiment, control logic 67 and 77 transfer cache line data words to the processor in order according to a determination of the probability that the processor will need the particular word. This approach can be best understood by referencing FIGS. 4a and 4b. In one such embodiment, words A, B C and D, in that order, represent the order of data criticality to the processor. The actual physical address which is considered critically ordered differs from processor to processor in existing implementations and may entail a modula-4 linear burst, a modula-4 interleaved order, etc. For the typical linear addressing microprocessor (e.g. PowerPC or Cyrix M1), the optimal transfer order is modula-4 linear burst. This ordering is shown in Table 1. Any other ordering for this type of processor will prevent maximal use of the transfer bandwidth between the cache memory and the processor. Hence, A, B, C, and D would show the following sequence represented in binary form in which X stands for "any":

TABLE 1

Linear Burst Data Ordering in a Four Entry Cache Line

| Initial address | A | B | C | D |
|---|---|---|---|---|
| x00 | x00 | x01 | x10 | x11 |
| x01 | x01 | x10 | x11 | x00 |

TABLE 1-continued

Linear Burst Data Ordering in a Four Entry Cache Line

| Initial address | A | B | C | D |
|---|---|---|---|---|
| x10 | x10 | x11 | x00 | x01 |
| x11 | x11 | x00 | x01 | x11 |

Note that the entries in the four entry cache line may be words, longwords, etc.

For processors which require interleaved burst order (e.g. Intel Pentium), a modula-4 interleaved burst order could be used. This ordering is shown in Table 2.

TABLE 2

Interleaved Burst Data Ordering in a Four Entry Cache Line

| Initial address | A | B | C | D |
|---|---|---|---|---|
| x00 | x00 | x01 | x10 | x11 |
| x01 | x01 | x00 | x11 | x10 |
| x10 | x10 | x11 | x00 | x01 |
| x11 | x11 | x10 | x01 | x00 |

In one embodiment, the order in which the cache line data words are transferred is programmable. Such a device would permit, for example, both interleaved and linear burst data ordering with the same cache device. In another embodiment, data ordering could be changed to reflect characteristics of the programs or programs being executed (e.g., a program operating at a particular stride through memory).

The data ordering is designed to minimize the complexity of implementation and to allow one memory array design to operate as a 96 or 80-bit bus device. In the embodiment shown in FIG. 4a, the entire block of four operands, tag and ECC are transferred in 3 bus cycles. Tag and ECC data appear only during the first cycle, freeing those input/output lines for data transfer during cycles two and three. In the embodiment shown, tag and ECC can be partitioned among the available two words in any manner.

On the other hand, in the embodiment shown in FIG. 4b, four bus cycles are still required to transfer all necessary data. As noted above, however, the approach shown in FIGS. 4a and 6 allow for a larger tag and/or ECC than would otherwise be possible, once again improving the utilization of the 80 input/output lines. Tag and ECC can share the first slot across the first through fourth cache transfer cycles 50. Performance is maximized, however, if all tag information can be supplied in the first cycle and non-time-critical information follows in subsequent cycles. (The entries labeled TAG/ECC can be any combination of ECC, general purpose status information or any tag extensions required by system 10.)

It should be noted that ECC is not a necessary component but it is important to allow space for this to be implemented. In one embodiment, the implementation would consist of a single data check of a full block (tag plus data A B C and D). This requires 11 bits of ECC for 256 bits of data plus up to 21 bits of tag/status information. The 21 bits is the limit imposed on the 96-bit device.

For 80-bit operation, to maximize performance, the tag limit is 16 bits. If more tag bits are needed, the 80-bits would be expanded within reason to accommodate the additional necessary bits. For example, in a system 10 based on 16-bit wide data words, if a 20-bit tag is essential, this would entail an 84-bit data bus 20. 11 bits of ECC is sufficient regardless of tag size, within reason.

Although the present invention has been described with reference to selected embodiments, those skilled in the art will recognize that changes may be made in form and detail without departing from the spirit and scope of the invention. In particular, although the description has been made in terms of 16-bit words, the width of the data, tag or ECC words could be increased or decreased, as could the width of the bus connecting the processor to the cache memory, and still fall within the scope of the claims.

What is claimed is:

1. A cache memory comprising:
   a plurality of cache lines, wherein each of the cache lines comprises a plurality of data words and tag words;
   a plurality of routing paths connected to each of the data words and the tag words; and
   a plurality of selection circuits connected to the routing paths;
   wherein the selection circuits select a first set of routing paths based on a first cache memory operating mode, and
   wherein the selection circuits select a second set of routing paths based on a second cache memory operating mode.

2. The cache memory of claim 1 wherein the first set of routing paths equals six.

3. The cache memory of claim 1 wherein the second set of routing paths equals five.

4. The cache memory of claim 1 wherein the first cache memory operating mode comprises three cache transfer cycles.

5. The cache memory of claim 1 wherein the second cache memory operating mode comprises four cache transfer cycles.

6. A memory device comprising:
   a bus having a bus width;
   a cache memory connected to the bus, the cache memory comprising a plurality of cache lines, wherein each of the cache lines comprises a plurality of data words and tag words;
   a plurality of routing paths connected to each of the data words and the tag words; and
   a plurality of selection circuits connected to the routing paths; wherein the selection circuits select a first set of routing paths when the bus width equals X-bit wide, and wherein the selection circuits select a second set of routing paths when the bus width equals Y-bit wide.

7. The memory device of claim 6 wherein the first set of routing paths equals six.

8. The memory device of claim 6 wherein the second set of routing paths equals five.

9. The memory device of claim 6 wherein X equals 96.

10. The memory device of claim 6 wherein Y equals 80.

11. A system comprising:
    a processor having a critical order for transferring data;
    a bus connected to the processor, wherein the bus comprises a bus width;
    a cache memory connected to the bus, wherein the cache memory comprises a plurality of cache lines, wherein each of the cache lines comprises a plurality of data words and tag words;
    a plurality of routing paths connected to each of the data words and the tag words;
    a plurality of selection circuits connected to the routing paths; and
    a selection control logic for controlling the selection circuits, wherein the selection control logic enables the selection circuits to select the data words and the tag words according to the critical order, and wherein the data words and the tag words are transferred between the cache memory and the processor in three bus cycles when the bus width is 96-bit wide.

12. A system comprising:
    a processor having a critical order for transferring data;
    a bus connected to the processor, wherein the bus comprises a bus width;
    a cache memory connected to the bus, wherein the cache memory comprises a plurality of cache lines, wherein each of the cache lines comprises a plurality of data words and tag words;
    a plurality of routing paths connected to each of the data words and the tag words;
    a plurality of selection circuits connected to the routing paths; and
    a selection control logic for controlling the selection circuits, wherein the selection control logic enables the selection circuits to select the data words and the tag words according to the critical order, wherein the data words and the tag words are transferred between the cache memory and the processor in four bus cycles when the bus width is 80-bit wide, and wherein both the data words and the tag words are transferred in each of the four bus cycles.

13. A method of transferring data between a cache memory and a processor, wherein the cache memory comprises a plurality of longwords and tag words, the method comprising:
    transferring a first longword and a tag word in a first transfer cycle;
    transferring a second longword and a first half of a third longword in a second transfer cycle; and
    transferring a fourth longword and a second half of the third longword in a third transfer cycle.

14. The method of claim 13 wherein the first transfer cycle including transferring 96 bits of data.

15. The method of claim 14 wherein the third transfer cycle including transferring 96 bits of data.

16. The method of claim 13 wherein the second transfer cycle including transferring 96 bits of data.

17. A method of transferring data between a cache memory and a processor, wherein the cache memory comprises a plurality of longwords and tag words, the method comprising:
    transferring a first longword and a first tag word in a first transfer cycle;
    transferring a second longword and a second tag word in a second transfer cycle;
    transferring a third longword and a third tag word in a third transfer cycle; and
    transferring a fourth longword and a fourth tag word in a fourth transfer cycle.

18. The method of claim 17 wherein the first transfer cycle including transferring 80 bits of data.

19. The method of claim 17 wherein the second transfer cycle including transferring 80 bits of data.

20. The method of claim 17 wherein the third transfer cycle including transferring 80 bits of data.

21. The method of claim 17 wherein the fourth transfer cycle including transferring 80 bits of data.

22. A method of transferring data between a cache memory and a processor, wherein the cache memory comprises a plurality of cache lines, wherein each of the cache lines comprises four 64-bit data and 32 bits of tag and error correction code (ECC), the method comprising:

transferring a first 64-bit data and the 32 bits of tag and ECC in a first transfer cycle;

transferring a second 64-bit data and a first half of a third 64-bit data in a second transfer cycle; and transferring a third 64-bit data and a second half of the third 64-bit data in a third transfer cycle.

23. The method of claim 22 further comprising:

determining a critical order according to the processor; and transferring the data according to the critical order.

24. A method of transferring data between a cache memory and a processor, wherein the cache memory comprises a plurality of cache lines, wherein each of the cache lines comprises four 64-bit data and 32 bits of tag and error correction code (ECC), the method comprising:

transferring a first 64-bit data and up to 16 bits of tag and ECC in a first transfer cycle;

transferring a second 64-bit data and up to 16 bits of tag and ECC in a second transfer cycle;

transferring a third 64-bit data and up to 16 bits of tag and ECC data in a third transfer cycle; and transferring a third 64-bit data and up to 16 bits of tag and ECC data in a fourth transfer cycle.

25. The method of claim 24 further comprising;

determining a critical order according to the processor; and transferring the data according to the critical order.

26. A method of operating a system having a cache memory, a bus and a processor, wherein the bus comprises a bus width, the method comprising:

configuring the cache memory to accommodate the bus width;

transferring data between the cache memory and the processor in three transfer cycles when the bus width is 96-bit wide.

27. The method of claim 26 further comprising;

transferring data between the cache memory and the processor in four transfer cycles when the bus's width is 80-bit wide.

28. The method of claim 27 further comprising:

determining a critical order according to the processor; and transferring the data according to the critical order.

29. A method of transferring data in a system having cache memory, a processor, and a bus, wherein the cache memory comprises a plurality of data words and tag words, the method comprising:

defining a width of the bus;

configuring the cache memory such that a width of a group of M words equals to the width of the bus;

transferring a first group of M words in a first cache transfer cycle, wherein the first group of M words includes a cache tag word and M-1 words from the plurality of data words;

transferring a second group of M words in a second cache transfer cycle, wherein the second group of M words includes M additional words from the plurality of data words; and transferring a third group of M words in a third cache transfer cycle, wherein the third group of M words includes M additional words from the plurality of data words.

30. A cache memory, comprising:

a configurable cache memory array having a plurality of cache lines, wherein each cache line includes a plurality of data words and tag words;

a processor-cache interface, wherein the processor cache interface includes an M-word wide bus, wherein M is greater than two; and a routing circuit connected to the configurable cache memory array and the processor-cache interface, wherein the routing circuit includes first cycle transfer means for transferring a first group of M words from the cache memory array to the processor-cache interface in a first cache transfer cycle, wherein the first group includes the tag words and M-1 words from the plurality of data words, second cycle transfer means for transferring a second group of M words from the cache memory array to the processor-cache interface in a second cache transfer cycle and third cycle transfer means for transferring a third group of M words from the cache memory array to the processor-cache interface in a third cache transfer cycle, wherein the configurable cache memory is configured such that each of the cache transfer cycle comprises a number of data bits equals N bits of data, and wherein N is a multiple of M.

31. The cache memory of claim 30 wherein M equals 6.

32. A cache memory, comprising:

a configurable cache memory array having a plurality of cache lines, wherein each cache line includes a plurality of data words and tag words;

a processor-cache interface, wherein the processor cache interface includes an M-word wide bus, wherein M is greater than two; and a routine circuit connected to the configurable cache memory array and the processor-cache interface, wherein the routing circuit includes first cycle transfer means for transferring a first group of M words from the cache memory array to the processor-cache interface in a first cache transfer cycle, wherein the first group includes the tag words and M-1 words from the plurality of data words, second cycle transfer means for transferring a second group of M words from the cache memory array to the processor-cache interface in a second cache transfer cycle and third cycle transfer means for transferring a third group of M words from the cache memory array to the processor-cache interface in a third cache transfer cycle, wherein the configurable cache memory is configured such that each of the cache transfer cycle comprises a number of data bits equals N bits of data, and wherein N is a multiple of M, wherein N equals 96.

33. A computer system, comprising:

a processor having an address bus and an M-word wide data bus;

a memory connected to the processor by the address bus and the data bus; and a configurable cache memory, wherein the configurable cache memory includes:

a memory array having a plurality of cache lines, wherein each cache line includes a plurality of data word tag words;

a processor-cache interface connected to the processor and the memory by the address bus and the data bus; and a routing circuit connected to the memory array and the processor-cache interface bus, wherein the routing circuit includes first cycle transfer means for transferring a first group of M words from the memory array through the processor-cache interface to the data bus in a first cache transfer cycle, wherein the first group includes the tag words and M-1 words from the plurality of data words, second cycle transfer means for transferring a second group of M words from the memory array through the processor-cache interface to the data bus in a second cache transfer cycle and third cycle transfer means for transferring a third group of M words from the memory array through the processor-cache interface to the data bus in a third cache transfer cycle, wherein the configurable cache memory is configured such that each of the cache transfer cycle comprises a number of data bits equals N bits of data, and wherein N is a multiple of M.

34. The cache memory of claim 33 wherein N equals 96.

35. The cache memory of claim 33 wherein M equals 6.

* * * * *